United States Patent [19]

Taguchi et al.

[11] Patent Number: 5,417,177

[45] Date of Patent: May 23, 1995

[54] AMPHIBIAN MOTOR VEHICLE

[75] Inventors: Haruhisa Taguchi; Nobuaki Inoue; Naomichi Sasa, all of Fujisawa, Japan

[73] Assignee: Isuzu Motors, Limited, Tokyo, Japan

[21] Appl. No.: 183,083

[22] Filed: Jan. 18, 1994

Related U.S. Application Data

[63] Continuation of Ser. No. 815,100, Dec. 27, 1991, abandoned.

[30] Foreign Application Priority Data

| Dec. 28, 1990 | [JP] | Japan | 2-402590 U |
| Dec. 28, 1990 | [JP] | Japan | 2-402591 U |
| Dec. 28, 1990 | [JP] | Japan | 2-402852 U |
| Dec. 28, 1990 | [JP] | Japan | 2-409581 |
| Mar. 29, 1991 | [JP] | Japan | 2-020166 U |
| Mar. 29, 1991 | [JP] | Japan | 2-020168 U |

[51] Int. Cl.[6] ............................ B63B 35/00
[52] U.S. Cl. ......................... 114/270; 165/44
[58] Field of Search ............ 114/270; 441/88; 165/41, 44, 51; 123/42.48, 41.49

[56] References Cited

U.S. PATENT DOCUMENTS

| 4,607,562 | 8/1986 | LeBlanc | 114/270 |
| 4,690,204 | 9/1987 | Reichel | 165/44 |
| 4,723,594 | 2/1988 | Koehr | 165/44 |
| 4,995,447 | 2/1991 | Weidmann | 165/44 |
| 5,046,550 | 9/1991 | Boll | 165/41 |

FOREIGN PATENT DOCUMENTS 687042 2/1953 European Pat. Off. .

*Primary Examiner*—Robert J. Oberleitner
*Assistant Examiner*—Clifford T. Bartz

[57] ABSTRACT

An amphibian motor vehicle comprises a watertight engine room formed in a lower part of a vehicle body, an air intake opening formed at a front part of the vehicle body such that the air intake opening is positioned above water level when the amphibian motor vehicle cruises on water, an air passage separated from the engine room and generally extending in a longitudinal direction of the vehicle body from the air intake opening and a radiator disposed in the air passage for air cooling a coolant flowing into the radiator from the engine.

15 Claims, 12 Drawing Sheets

AMPHIBIAN MOTOR VEHICLE

RELATED APPLICATIONS

This application is a continuation of U.S. Ser. No. 07/815,100, filed Dec. 27, 1991, now abandoned.

BACKGROUND OF THE INVENTION

1. Technical Field

The present invention relates to an amphibian motor vehicle having a watertight engine room at a lower part of a vehicle body.

2. Background Art

Various amphibian motor vehicles are known. As shown in FIGS. 21 and 22 of the accompanying drawings, a typical conventional amphibian motor vehicle 1 includes a watertight vehicle body 2, front wheels 3, rear wheel 4 and a propeller (screw) 5. The wheels 3 and 4 are used to run on a ground and the propeller 5 is used to proceed on the water. The engine 6 drives the wheels 3 and 4 as well as the propeller 5. The engine 6 is placed in a lower part of the vehicle body 1. An engine room 8 which houses the engine 6 has to be cooled but it is important to insure that an engine room 8 is watertight even when the engine room 8 is cooled.

One example of the engine room is shown in Japanese Utility Model Application No. 54-140137, entitled "Engine Cooling Apparatus for Amphibian Motor Vehicles". As shown in FIG. 23, the engine room 8 is defined by walls 9 such that the engine room 8 is almost closed. The engine room 8 has ducts 10 and 11 extending upward. The engine 6 has an intake pipe 10 and an exhaust pipe 11. These pipes 10 and 11 extend upward in the ducts 12 and 13 respectively such that the pipes 10 and 11 can reach the air above the water level L when the vehicle 1 is cruising on the water. Free open ends of the pipes 10 and 11 extend substantially horizontal. This structure prevents the water from entering the engine room 8. Provided next to the engine 6 is a radiator 15 for cooling the engine 6. A pipe 14 connects the radiator 15 with the engine 6. The radiator 15 stands substantially vertical in the engine room 8. The radiator 15 radiates heat of a coolant flowing from the engine 6. The radiator 15 is not cooled by natural flow of air such as wind or convection so that it must be cooled by a fan 16 driven by the engine 6 or other elements.

The ducts 12 and 13 are designed to extend above the water level L when the vehicle is on the water. Thus, external air comes into and goes out of the engine room 8 through the ducts 12 and 13.

In a certain actual embodiment, the ducts 12 and 13 extend in the vehicle body 2, external air-introducing vent holes 17 are made in lateral walls of the vehicle body 2 (near a driver seat 7) and air-exhausting vent holes 18 are made in an upper wall of the vehicle body 2 (above the engine room 8), as shown in FIGS. 21 and 22. Therefore, the external air flows into the vent holes 17 and 18 and ducts 12 and 13 to reach and cool the radiator 15. In addition to the fan 16, there is provided an electrically driven fan (not shown) to expel hot air from the engine room 8 and/or to ventilate the engine room as desired.

Various types of arrangements for supporting the radiator 15 have been proposed in the case of ordinary vehicles. For example, Japanese Utility Model Application No. 55-165829, entitled "Radiator Supporting Structure", discloses a U-shaped bracket to support the radiator, which bracket is mounted on a vehicle body with bolts and nuts. Japanese Utility Model Application No. 60-130135, entitled "Radiator Mounting Structure", discloses box-shaped cross members secured on a front portion of a vehicle body to receive a lower tank of the radiator.

These conventional amphibian motor vehicles have following problems. To cool the radiator 15, the fan 16 should be driven all the time, but this lowers an engine output. In order to overcome this problem, cooling the radiator with air should be taken into account. Such cooling is commonly done by a radiator cooling construction used in a conventional ground-running vehicle. For instance, Japanese Utility Model Application No. 62-95940 ("Engine Room Arrangement") and Japanese Utility Model Application No. 62-74030 ("Radiator Arrangement") respectively disclose a structure for introducing the air into a radiator room and expelling the air to a rear of a vehicle. However, according to these teachings, the air passing through the radiator is guided in front of or at the back of the front wheels. Therefore, if an amount of the air to the right front wheel becomes larger or smaller than that to the left front Wheel, the front wheels may loose the balance and a vehicle may loose stability. Accordingly, if a ventilation passage structure employed in an ordinary ground-running vehicle is applied to the amphibian motor vehicle, it is important to insure that such a problem will not occur. And, of course, the radiator cooling arrangement for the ground vehicle cannot be directly applied to the amphibian vehicle since the engine room of the amphibian vehicle has to be watertight.

Further, since the engine room 8 is formed at a lower part of the vehicle body 2 and the radiator 15 stands in front of the engine 6 in the conventional amphibian motor vehicle, the location of the radiator 15 is limited to the lower part of the vehicle body 2. Therefore, it is impossible to manufacture an amphibian motor vehicle which exhibits the high on-water performance of an ordinary marine vessel.

There is another problem in applying the radiator supporting structure of the ordinary ground vehicle to the amphibian motor vehicle. The radiator 15 should be large in size in order to insure sufficient cooling. However, as the radiator 15 becomes larger, the supporting structure for the radiator 15 becomes larger. As a result of using a large supporting bracket, for example, the weight of the vehicle becomes large. The amphibian vehicle has a requirement of being lightweight. Therefore, the large supporting structure cannot be used. In addition, the conventional radiator is mounted on the supporting structure with screws. Therefore, mounting and removing the radiator is troublesome.

Moreover, since the engine room 8 is almost closed, heat of the exhaust pipe 11 raises the temperature of the engine room 8 and vehicle body 2. This may damage peripheral parts as well as the engine room 8 and the vehicle body 2.

SUMMARY OF THE INVENTION

An object of the present invention is to cool a radiator without a motor-driven or electrically driven fan so as to eliminate the loss due to such a fan.

Another object of the present invention is to locate the radiator in a manner not to affect vehicle structure so as to obtain high on-water running performance.

Still another object of the present invention is to facilitate mounting and removing of the radiator.

Yet another object of the present invention is to simplify a radiator supporting structure so as to reduce weight of the vehicle.

Another object of the present invention is to eliminate problems caused by heat from an engine exhaust line.

According to one aspect of the present invention, there is provided an amphibian motor vehicle comprising a watertight engine room in a lower part of a vehicle body, an air intake opening at a front part of the vehicle body such that the air intake opening is positioned above water level when the amphibian motor vehicle cruises on a water, an air passage separated from the engine room and extending generally in the longitudinal direction of the vehicle body from the air intake opening and radiator means placed in the air passage for air cooling a coolant flowing into the radiator means from the engine.

The amphibian motor vehicle may further include means for supporting the radiator means in a posture inclined forward relatively close to horizontal.

The air passage is preferably formed above the engine room.

The air passage extends to an air exit which may be formed at an upper front part of the vehicle body.

Preferably, the amphibian motor vehicle includes a negative pressure generator which produces negative pressure using wind coming into the air passage as the vehicle moves. The negative pressure generator may be provided at the air passage exit or in a downstream half of the air passage.

The radiator supporting means may include a mounting base for supporting a bottom of the radiator means and a removable holding member for pressing the top of the radiator means downward.

The upper front part of the vehicle body may be defined by a bonnet and the holding member may include a holding plate mounted on an inner face of the bonnet.

According to a second aspect of the present invention, there is provided an amphibian motor vehicle comprising a water-tight engine room formed in a lower part of a vehicle body, an air intake opening formed at a front part of the vehicle body such that the air intake opening is positioned above water level when the amphibian motor vehicle cruises on a water, an air exit formed at a rear part of the vehicle body, an air passage separated from the engine room and extending generally in a longitudinal direction of the vehicle body along a lateral part of the vehicle body from the air intake opening to the air exit and radiator means placed into the air passage for air cooling a coolant flowing in the radiator means from the engine.

Preferably, the amphibian motor vehicle has no doors in the lateral part thereof.

According to a third aspect of the present invention, there is provided an amphibian motor vehicle comprising a water-tight engine room formed in a lower part of a vehicle body, an air intake opening formed at a front part of the vehicle body such that the air intake opening is positioned above water level when the amphibian motor vehicle cruises on a water, an air exit formed at a lateral part of the vehicle body and opening to the atmosphere at a position above and behind front wheels of the vehicle, an air passage separated from the engine room and extending generally in a longitudinal direction of the vehicle body from the air intake opening to the air exit and radiator means placed in the air passage for air cooling a coolant flowing into the radiator means from the engine.

The air exit may be defined by an opening formed in a front pillar of a front window of the vehicle.

The air passage preferably extends substantially horizontal or slightly downward from the front of the vehicle to the rear of the vehicle or in the longitudinal direction of the vehicle body.

An exhaust line of the engine preferably extends in the air passage downstream of the radiator means.

The air exit may include a plurality of openings formed at both sides of the vehicle body and the air passage may be divided, at a predetermined position in the front half of the vehicle body, into a plurality of branch lines.

The radiator means may be located ahead of the predetermined branching position.

One radiator means may be placed in each branch line of the air passage.

A partition plate may be placed in front of the branching position in the air passage such that the air passage is divided into two ways upstream of the branching position.

Preferably, the partition plate is placed to divide the air passage into two ways such that a volume of air flowing into one is larger than that flowing into the other, and the one way extends to a branch line having a larger resistance whereas the other way extends to a branch line having a smaller resistance.

The radiator means may be placed in one branch line whereas an exhaust line of the engine may be placed in the other branch line.

The exhaust line preferably terminates upstream of the exit of the air passage.

The vehicle body may be made from synthetic resin.

The air passage may include a resin-made duct or a partition plate.

With the above described structures, the radiator means is cooled with the air coming into the air passage. The air is forced into the air passage as the vehicle runs or naturally comes into the air passage as the vehicle stops. Therefore, it is not necessary to provide a motor (engine) driven or electrically driven fan for cooling the radiator. Accordingly, there is no engine loss due to the fan. Further, the air passage and radiator do not affect the watertightness of the engine room. In addition, the air expelled from the air passage does not Influence stability and maneuverability of the vehicle.

Since the radiator is separated from the engine room and engine, the vehicle body can be designed to a desired configuration as a marine vessel.

Mounting and removing of the radiator become easy because of the radiator supporting structure. Also, the radiator supporting structure of the present invention is simple so that the total weight of the vehicle is reduced.

The exhaust line extends in the air passage and is cooled by the air flowing in the air passage. Therefore, trouble caused by heat of the exhaust line is prevented.

Other aspects, objects and advantages of the present invention will be apparent from the detailed description as read in conjunction with the claims and attached drawings.

DESCRIPTION OF PREFERRED EMBODIMENTS

Now, preferred embodiments of the present invention will be described with reference to the accompanying drawings.

Figure 1:
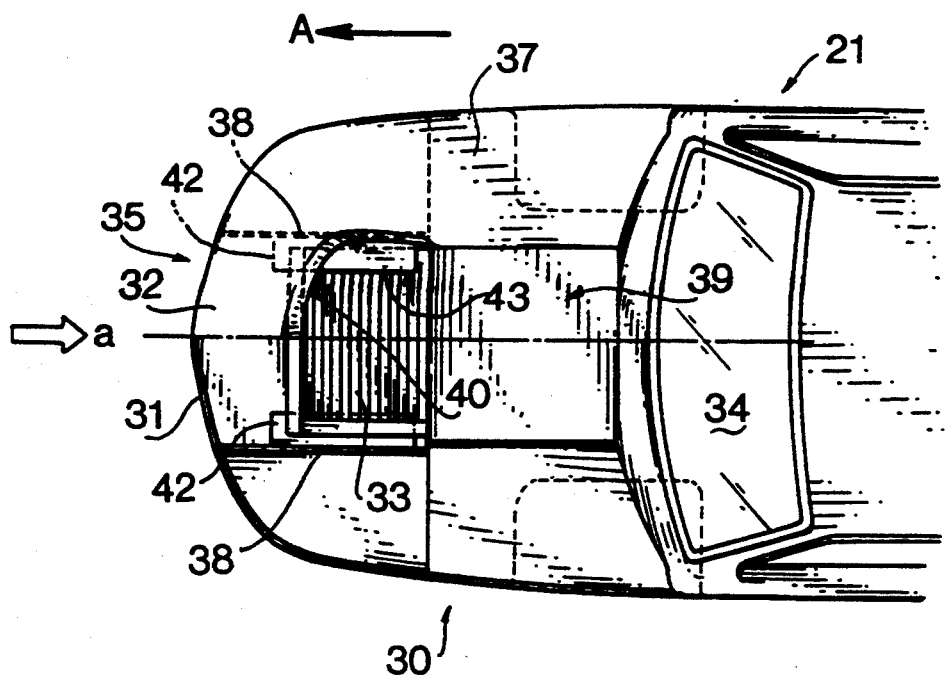
FIG. 1 is a top view of a major part of an amphibian motor vehicle according to a first embodiment of the present invention.
Figure 2:
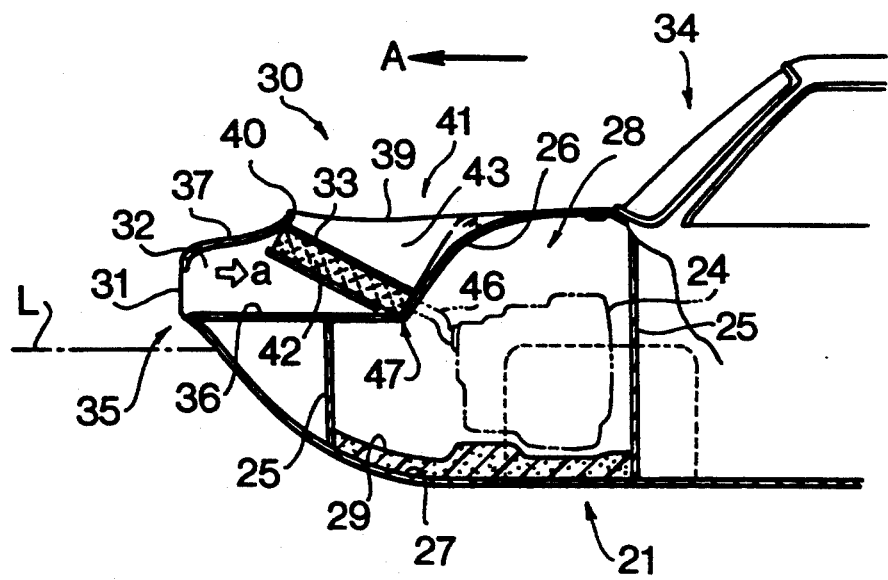
FIG. 2 is a lateral view of the vehicle of FIG. 1.
Figure 3:
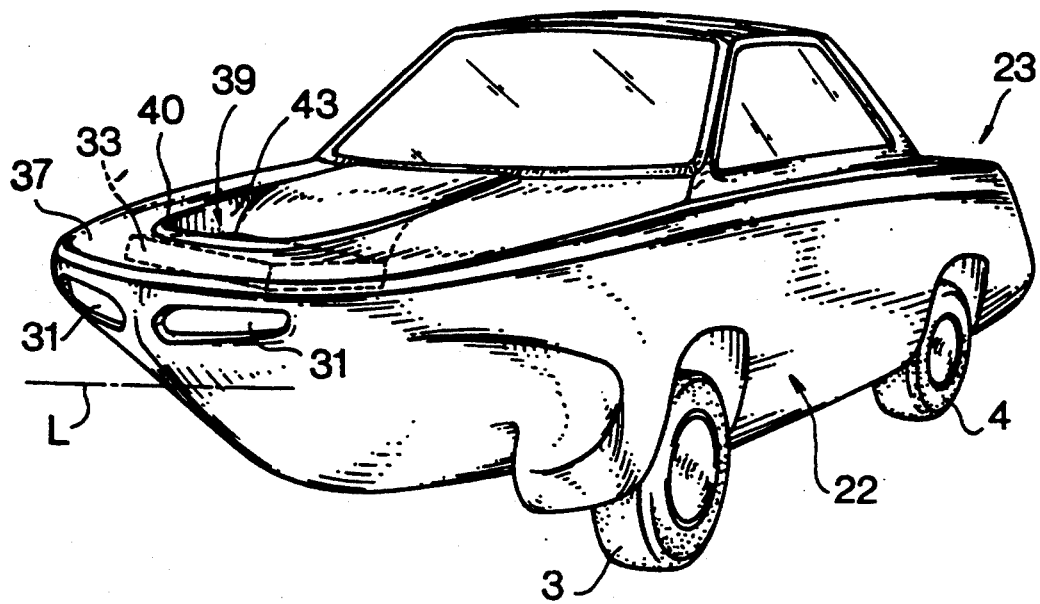
FIG. 3 is a perspective view of the vehicle of FIG. 1.

Referring to FIGS. 1 to 3, illustrated is an amphibian motor vehicle according to a first embodiment of the present invention. The amphibian motor vehicle includes a watertight vehicle body 21 and can run on the water. The vehicle body 21 may be made from a synthetic resin. A lower portion 22 of the vehicle body 21 is shaped like a boat which is suitable for water driving. A propeller (not shown) is provided at a rear 23 part of the vehicle body 21 so that the vehicle can move on the water. Wheels 3 and 4 are provided at the lower portion 22 of the vehicle body 21 so that the vehicle can move on the ground. A clutch (not shown) selectively connects the propeller or the wheels 3 and 4 with the engine 24 by a power transmission shaft such as a propeller shaft (not shown) so that the propeller and the wheels 3 and 4 are driven by the engine 24 as desired. The engine 24 is located in an engine room 28. The engine room 28 is watertight and defined by partition walls 25, engine cover 26 and bottom plate 27. The engine 24 is secured on a floor element 29 of the bottom plate 27. Two axle shafts (not shown) extend in the vehicle body 21 transversely such that the front and rear wheels 3 and 4 are mounted on free ends of these axle shafts, respectively. The axle shafts are supported by a suspension mechanism (not shown) which is watertight and inside or outside the vehicle body 21.

A structure to cool the engine 24 includes an air intake opening 31, a vent passage 32 and a radiator 33 placed in the air passage 32. The air intake openings 31 are formed in a front part 30 of the vehicle body 21. The vent passage 32 extends rearward from the air intake openings 31. The arrow A indicates a direction the vehicle is supposed to move in a normal case.

The front part 30 of the vehicle 21 is positioned in front of a driver's seat 34. The engine room 28 is formed in the front part 30. A front nose 35 which is similar to a bow 1s formed in front of the engine room 28. The air intake openings 31 are formed in the nose 35 such that the air intake openings 31 are positioned above the water level when the vehicle floats and cruises on the water. In this embodiment, there are two symmetric air intake openings 31 as shown in FIG. 3. However, the number of the openings may be other than two. For example, one, three or four openings may be formed.

The air passage 32 is defined by a substantially horizontal deck plate 36, an arch-shaped engine cover 26 extending upward from the deck plate 36, a bonnet 37 and a pair of vertical plates 38. The deck plate 36 and the engine cover 26 form a bottom wall of the air vent passage 32, the bonnet 37 forms a top wall of the air vent passage 32 and the vertical plates 38 form lateral walls. An air discharge opening 39 which is a downstream end of the air vent passage 32 is formed in the bonnet 37. The air discharge opening 39 is shaped substantially rectangular. Therefore, the air vent passage 32 first extends horizontally backward and then curves diagonally upward. A negative pressure generator 40 is located in the downstream half of the air vent passage 32. The air discharge opening 39 is defined by the negative pressure generator 40.

The radiator 30 fits in the air vent passage 32 and is supported by a radiator supporting structure 41. The radiator 30 inclines forward and extends relatively close to horizontal.

The radiator supporting structure 41 includes a radiator mounting base 42 and a pair of holding plates 43. The radiator mounting base 42 is mounted on the vertical plates 38. The holding plates 43 are mounted on the inner wall of the bonnet 37. Therefore, the radiator 33 stands on the mounting base 42 and is held down by the holding plates 43.

Figure 4:
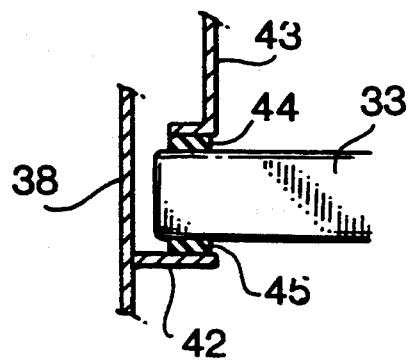
FIG. 4 shows a sectional view of radiator and radiator supporting structure of FIG. 1.

Referring now to FIG. 4, elastic members 44 and 45 as of rubber are attached on the holding plates 43 and the radiator mounting base 42 at their inner faces respectively so that the radiator 33 is protected from shock and vibration during the driving and when the bonnet is closed.

As illustrated in FIG. 2, a coolant pipe 46 connects the radiator 33 with the engine 24. The coolant pipe 46 penetrates the engine cover 26 and a packing 47 is provided at a Junction of the coolant pipe 46 and the engine cover 26 to insure sufficient sealing. The packing 47 may be made from a heat resistant and weatherproof material.

The amphibian motor vehicle runs on the ground using the wheels 3 and 4 like an ordinary ground vehicle and cruises on the water using the propeller like an ordinary boat.

During driving or cruising, air "a" comes into the air passage 32 from the air intake opening 31. Simultaneously, the negative pressure generator 40 produces a negative pressure at the air discharge opening 39 based on a speed of the vehicle or vessel. Therefore, the pressure in front of the radiator 1s made positive whereas the pressure at the back of the radiator is made negative. This facilitates the ventilation or air flow in the air passage 32. Specifically, the air can easily flow into and out of the air passage 32. The radiator 33 is cooled with this air and the temperature of the coolant in the radiator is maintained within an appropriate range.

During warming up of the amphibian motor vehicle, hot air in the engine room 28 heats the engine cover 26, and meanwhile the radiator 33 becomes hot. Therefore, an upward natural convection occurs in the air passage 32 so that the air naturally flows upward or downstream in the air passage 32. This natural convection produces an air flow in the air passage 32. Thus, the radiator 33 is cooled during the warming up of the vehicle.

In this manner, the radiator 33 is cooled by the air, so that the motor-driven or electrically-driven cooling fan is unnecessary. Consequently, an energy of the motor (engine) is not spent for driving the fan.

Further, since the radiator 33 is supported on the mounting base 42 by the holding plates 43, the radiator 33 is exposed when the bonnet 37 is opened. Also, bolts and nuts are not necessary to mount the radiator 33. This simplifies radiator mounting and removing. In addition, since special brackets and bolts are not used to secure the radiator, the vehicle can be designed lightweight. Incidentally, the negative pressure generator 40 may be located near or at the exit 39 of the air passage 32.

Figure 5:
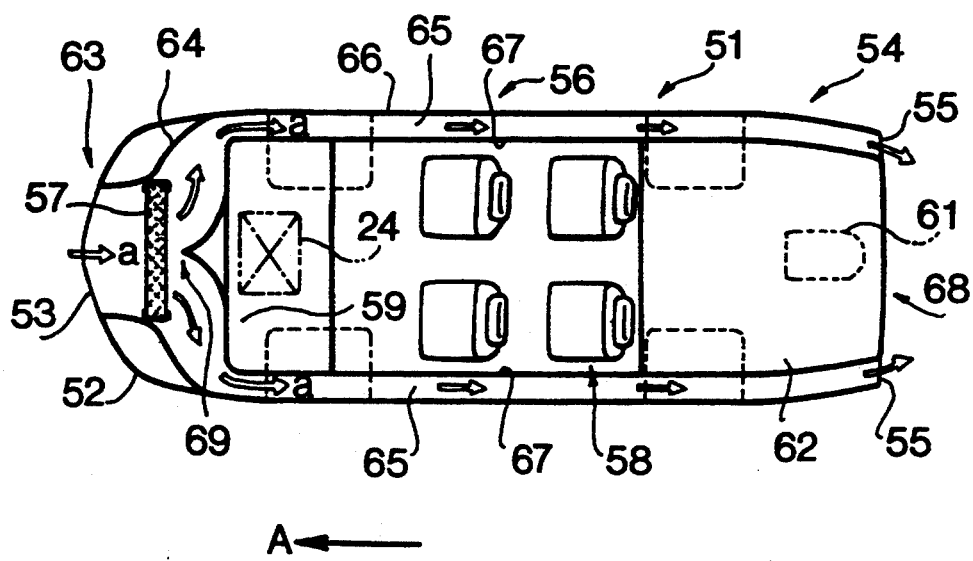
FIG. 5 is a top view showing a second embodiment of the present invention.
Figure 7:
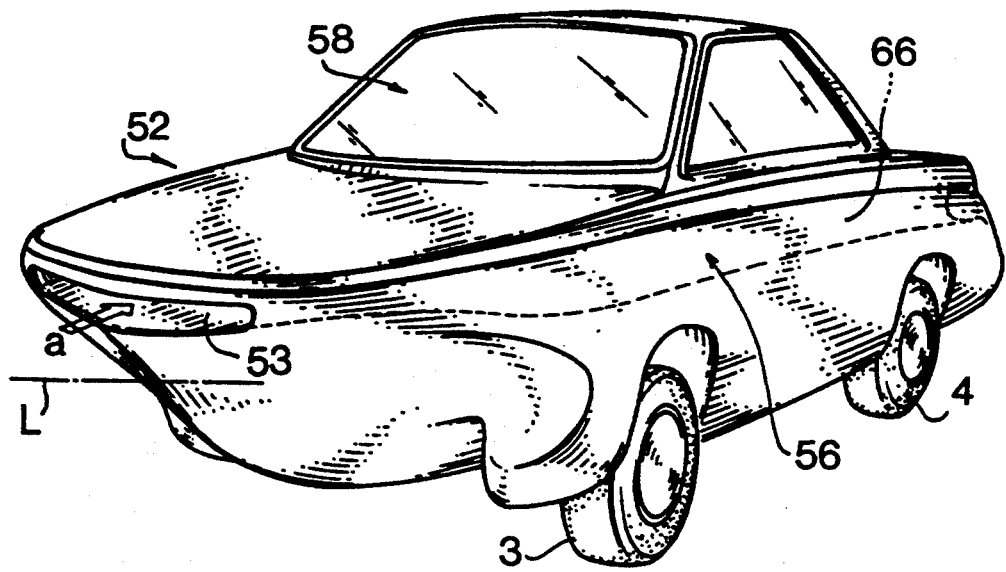
FIG. 7 is a perspective view of FIG. 5.

A second embodiment of the present invention will be described with reference to FIGS. 5 and 7.

The amphibian motor vehicle has an air intake opening 53 at a nose or stern 52 of a vehicle body S1. The air intake opening 53 is formed to be positioned above the water level L when the vehicle cruises on the water. Air discharge openings 55 are formed at the tail 54 of the vehicle body 51. Air passages 56 are formed along lateral portions of the vehicle body 51, extending from the single air intake opening 53 to the plural discharge openings 55. A radiator 57 is located in the air passage 56. The vehicle body 51 may be made from synthetic resin.

In this embodiment, the vehicle body 51 has no doors in the lateral portion thereof because maneuverability, water-tightness and weight (the lighter, the better) are taken in account. Like the first embodiment, a watertight engine room 59 is formed in a lower front area ahead of a driver and passenger room 58. An engine 24 stands on the floor 60 of the engine room 59. The vehicle has wheels 3 and 4 as well as a propeller 61. The propeller 61 is housed in a rear room 62. A fuel tank (not shown) is also housed in the rear room 62.

Figure 6:
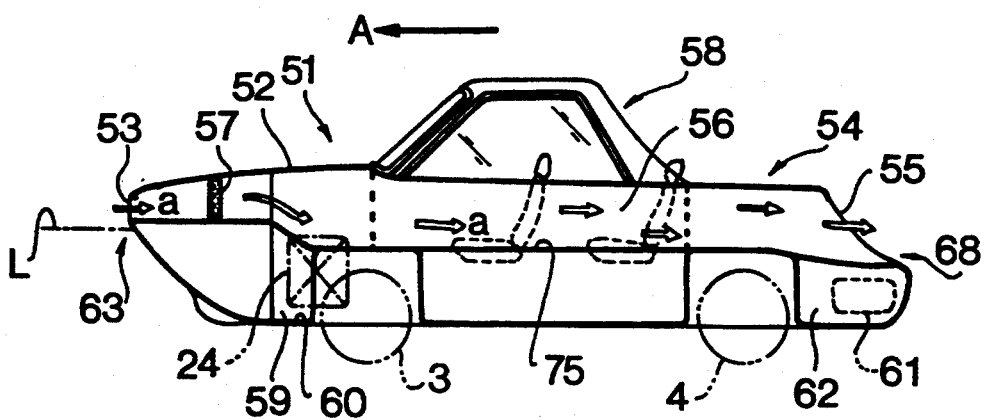
FIG. 6 is a lateral view of FIG. 5.

The air intake opening 53 is formed above and in front of the engine room 59 as shown in FIG. 6. The air intake opening 53 is shaped oval or rectangular as viewed from a front as shown in FIG. 7. Referring to FIG. 5, the air passage 56 includes a resin-made duct 64 and two branches 65 extending from the duct 64. Therefore, the air coming into the air intake opening 53 is branched into two flows by the duct 64 and these two flows enter the two branch passages 65, respectively. Each branch passage 65 is defined by a side and bottom wall plate 66 and a partition plate 67. The side and bottom wall plate 66 forms a lateral wall of the vehicle body 51. The partition plate 67 defines the engine room 59, driver and passenger room 58 and the rear room 62. A rear end of each branch passage 65 opens to the air at a rear end 68 of the vehicle body 51, thereby forming an air exit 55.

As shown in FIG. 6, a bottom wall of the air passage 56 extends substantially horizontal till the air passage 56 reaches the engine room 59. The bottom wall of the air passage 56 then goes down slightly or may extend substantially horizontal.

The radiator 57 fits in the duct 64. Specifically, the radiator 57 is supported by walls of the duct 64 and placed just behind the air intake opening 58 but in front of a branching point 69 of the air passage 56. The radiator 57 is connected with the engine 24 by a coolant pipe (not shown). Therefore, the radiator 57 is separated from the engine room 59 by the duct 64 and located above the engine 24.

Heat is radiated from the engine 24 during the driving or cruising of the vehicle. This heat is absorbed by the coolant and the coolant is cooled by the radiator 57. The radiator 57 is cooled by the external air coming into air passage 56 from the air intake opening 53, as indicated by the arrow "a" since the external air flows toward the vehicle as the vehicle moves. The air which carries the heat flows in the air passage 56 along the vehicle body 51 and is expelled to the atmosphere from the air exits 55 at the tail 68 of the vehicle body 51. Even while the vehicle is not moving, the radiator 57 is cooled with the air which naturally flows into the air passage 56.

When the vehicle is cruising on the water, the air intake opening 53 is positioned a little above the water level L. However, water may occasionally come into the air passage 56 due to waves and winds. Such water is smoothly guided to the rear exits 55 through the air passage 56 due to a downward inclination of the air passage 56.

Like the first embodiment, the radiator 57 is sufficiently cooled with the air which is forced into the air passage 56 or which flows naturally into the air passage 56. Therefore, it is not necessary to provide a motor driven or an electrically driven cooling fan. In addition, even if a certain cooling fan is provided to cool the radiator, it is not always necessary to drive such a fan. In other words, the engine loss is reduced.

Particularly in this embodiment, since the air exits 55 are formed at the tail 68 of the vehicle body 51, there is produced a large pressure difference between the air intake opening 53 (positive pressure) and each air exit 55 (negative pressure). Accordingly, the air flow is promoted and the radiator is cooled in an expected manner. Further, since the air exits 55 are formed at the rear end 54 of the vehicle body 51, the expelled air does not hit the wheels and does not affect the maneuverability of the vehicle.

Since the air passage 56 is a smooth air way without substantial obstacles in the air stream direction A and inclined downward, the water coming into the air passage 56 is quickly discharged from the air passage 56. Therefore, special drain structures are not necessary.

Figure 8:
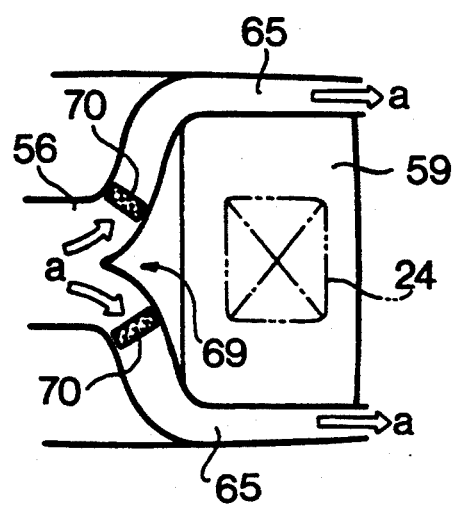
FIG. 8 illustrates a partial top view of an amphibian motor vehicle similar to that shown in FIG. 5.

In the illustrated embodiment, the radiator 56 is placed in front of the branching point 69. However, two radiators 70 may be provided in each branch passage 65, as shown in FIG. 8. In this case, one of the radiators 70 may be replaced with an oil cooler.

A third embodiment of the present invention will be described with reference to FIGS. 9, 10, 11 and 12.

Figure 9:
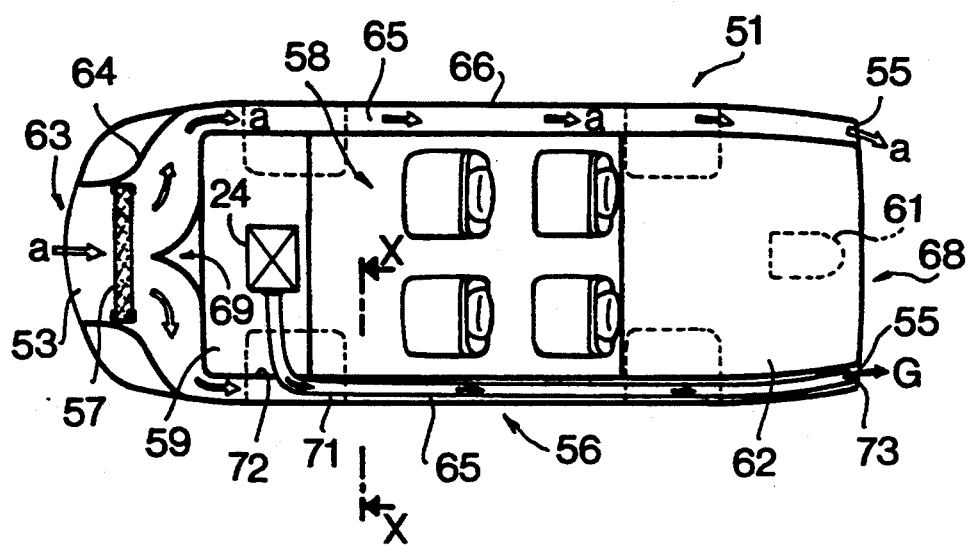
FIG. 9 illustrates a top view of a third embodiment of the present invention.

Referring first to FIG. 9, the amphibian motor vehicle has the air intake port 53, the air exit port 55, the two-way-branched air passage 56 and the radiator 57, like the second embodiment. A major difference is the location of an exhaust pipe 71. Specifically, the exhaust pipe 71 is placed in the air passage 56 in this particular embodiment. The vehicle body may be made from synthetic resin.

Figure 10:
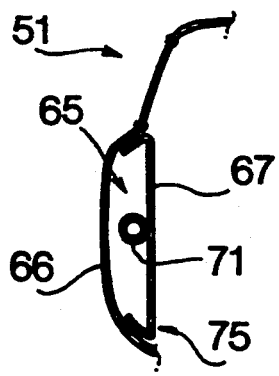
FIG. 10 illustrates a sectional view taken along the line X—X in FIG. 9.

As illustrated in FIG. 10, each branch line 65 is mainly defined by the side and bottom wall plate 66 and the partition plate 67 and the exhaust pipe 71 extends in one branch line 65. As shown in FIG. 9, the exhaust pipe 71 extends from the engine 24 transversely and penetrates the side wall 72 of the engine room 59. After penetrating the side wall 72, the exhaust pipe 71 extends along the branch line 65. The exhaust pipe 71 terminates before it reaches the rear end 55 of the branch line 65. Numeral 73 designates a free end of the exhaust pipe 71.

Figure 11:
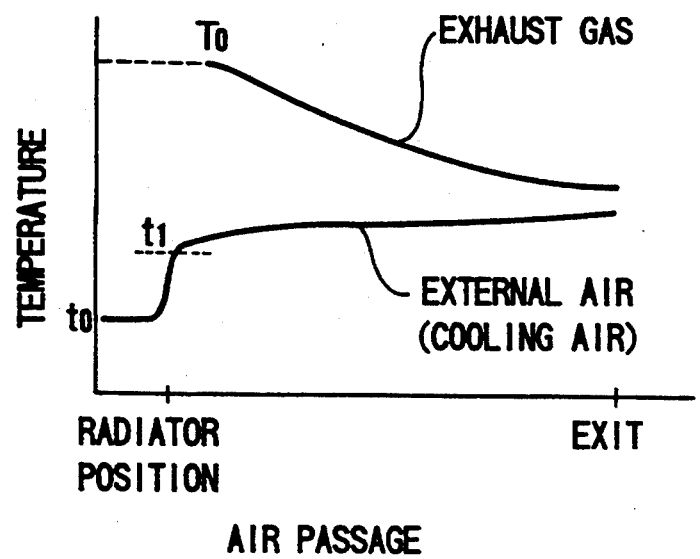
FIG. 11 illustrates a relation between an air passage and temperature.

With this structure, the radiator 57 is appropriately cooled with external air coming into the air passage 56. Exhaust gas G from the engine 24 flows in the exhaust pipe 71 extending in one branch line 65 along the side of the vehicle body 51 and expelled to the atmosphere like the air flowing through the same or other branch line 65. Heat of the exhaust gas G is heat exchanged with the external air introduced into the air passage 56 as shown in FIG. 11. Temperature of the air in the air passage 56 is raised to a value $t_1$ which is higher than an external air temperature $t_o$ as the air passes through the radiator 57. Even so, the value $t_1$ is considerably lower than the temperature $T_o$ of the exhaust gas G discharged from the engine 24. This means that the exhaust gas G is cooled as it proceeds to the air exit 55.

Since the end 73 of the exhaust pipe 71 is in front of the end 55 of the air passage 65, the pressure of the exhaust gas G facilitates the air stream in the same air passage 65.

Other structure and advantages of this embodiment are the same as those of the second embodiment. Therefore, these are not explained here.

Figure 12:
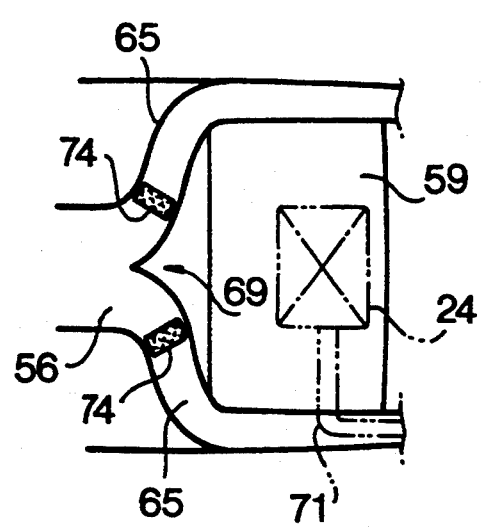
FIG. 12 is a partial top view of an amphibian motor vehicle similar to that shown in FIG. 9.

FIG. 12 shows the structure of the third embodiment with minor modifications. As illustrated, there are provided two radiators 74 downstream of the branching point 69 in the air passages respectively. In this case also, the radiator 74 should be located upstream of the exhaust pipe 71.

In the second and third embodiments, the air passage 56 has two branches 65 extending along the sides of the vehicle body 51. However, the air passage 56 may not be branched and a single passage may extend to the rear 68 along one side of the vehicle body 51.

Figure 13:
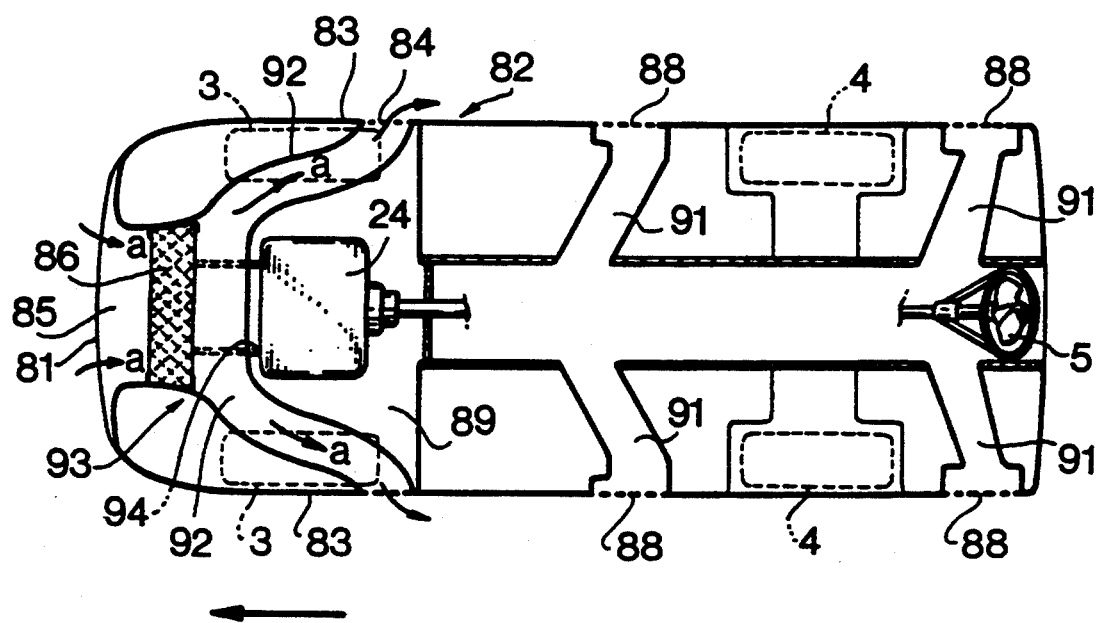
FIG. 13 is a top view of a fourth embodiment of the present invention.
Figure 14:
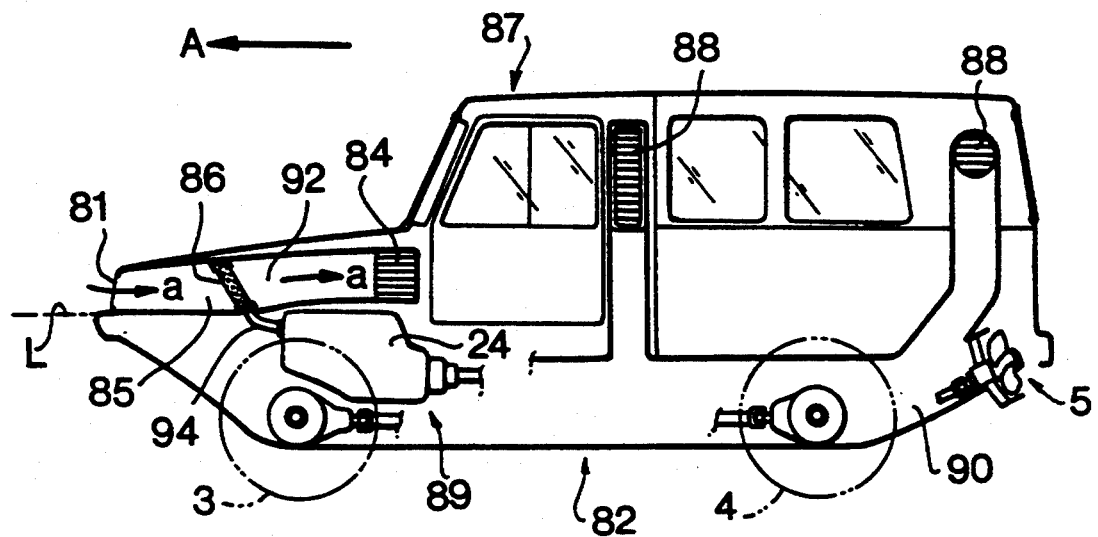
FIG. 14 shows a lateral view of FIG. 13.

A fourth embodiment of the present invention will be explained with reference to FIGS. 13 and 14.

The amphibian motor car includes an air entrance 81, an air passage 85 and air exits 84, like the foregoing embodiment. The air passage exits 84 open to the atmosphere at the lateral parts of a vehicle body 82. A radiator 86 is placed in the air passage 85. The vehicle body 82 may be made from synthetic resin.

The vehicle body 82 is designed to be watertight and to have adequate maneuverability. Air windows 88 are formed at both sides of a passenger's room 87. There are four air windows 88 in this embodiment as seen in FIG. 14. External air comes into and goes out of the vehicle body 82 through the air windows 88. The external air in the vehicle body 82 also flows to an engine room 89 and a rear room 90 through another air passage 91. Like the previous embodiment, the engine room 89 is watertight and the engine 24 is placed in the engine room 89.

The main air passage 85 is a single pipe up to the front half thereof, and then divided into two branches 92. The front half of the air passage 85 extends in a longitudinal direction of the vehicle body 82 and the two branches extend diagonally to lateral faces of the vehicle body 82.

The air entrance 81 is formed in a front face of the vehicle body 82 and the air exits are formed in the lateral faces of the vehicle body 82. The air exits 84 are formed above and behind the front wheels 3. The radiator 86 is placed near the air entrance 81 and in the front half of the air passage 85. The radiator 86 is communicated with the engine 24 by a coolant pipe 94. Numeral 95 designates a driver's seat.

The radiator 86 is sufficiently cooled with the air forced into the air passage 85 as the vehicle moves or with the air naturally coming into the air passage 85 as the vehicle stops. The air expelled from the air passage 85 does not deteriorate the running stability of the vehicle since the air exit 84 is formed above and behind the front wheels 3. Further, since the air passage 85 is relatively short, air or channel resistance is relatively small and therefore the air flowing toward the vehicle can be used effectively.

Figure 15:
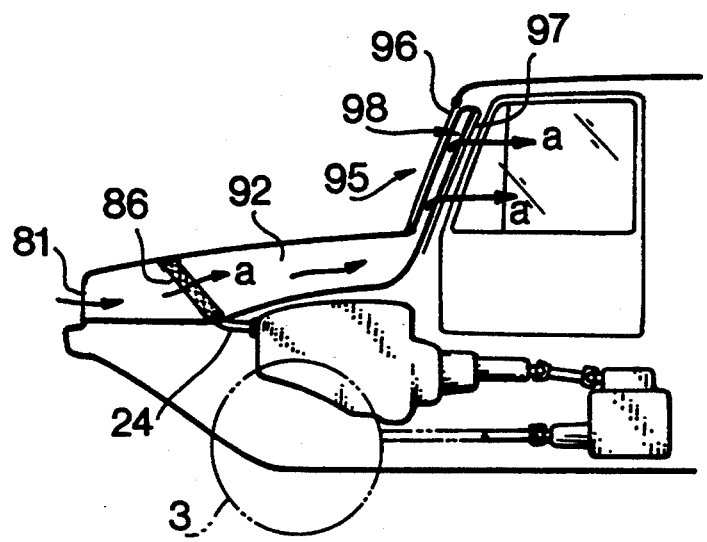
FIG. 15 shows a partial lateral view of an amphibian motor vehicle similar to that shown in FIG. 14.
Figure 16:
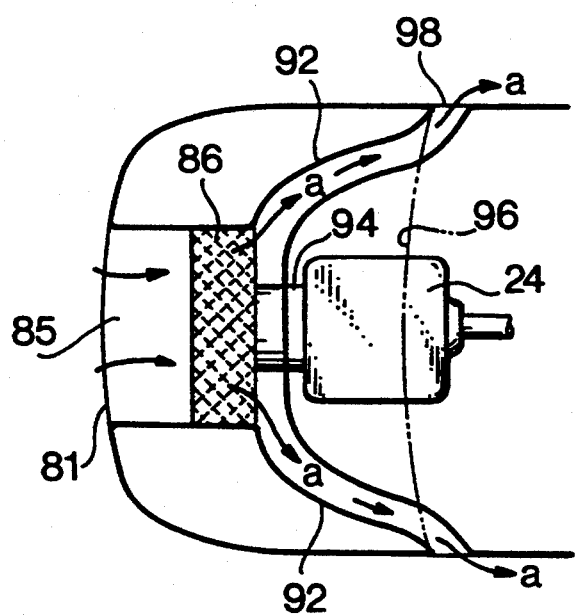
FIG. 16 shows a top view of FIG. 15.

In this embodiment, the air exits 84 are formed at a relatively front area of the vehicle body 82. However, air exits 98 may be formed at front pillars 97 of front windows 96 as shown in FIGS. 15 and 16. In such a case, the front pillars 97 are made hollow and communicated with the branch lines 92 such that the air "a" can flow laterally and backwardly. The location of the air exit 98 of FIG. 15 is further above the location of the air exit 83 of FIG. 13. Therefore, less water comes into the air passage 85 during cruising.

Figure 17:
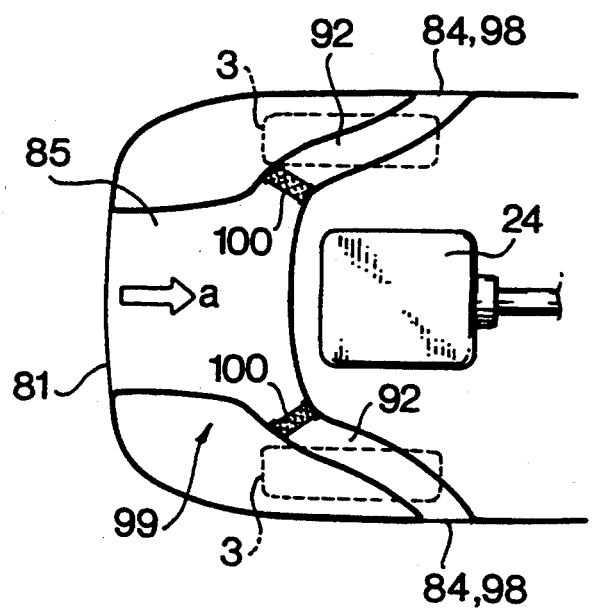
FIG. 17 shows a partial top view of an amphibian motor vehicle similar to that shown in FIG. 16.

There may be provided two radiators 100 in the branch lines 99 respectively, as shown in FIG. 17. Further, the entire air passage 85 may be a single way without any branches. In such a case, the air passage 85 simply extends to the exit 84 or 98 from the entrance 81.

Figure 18:
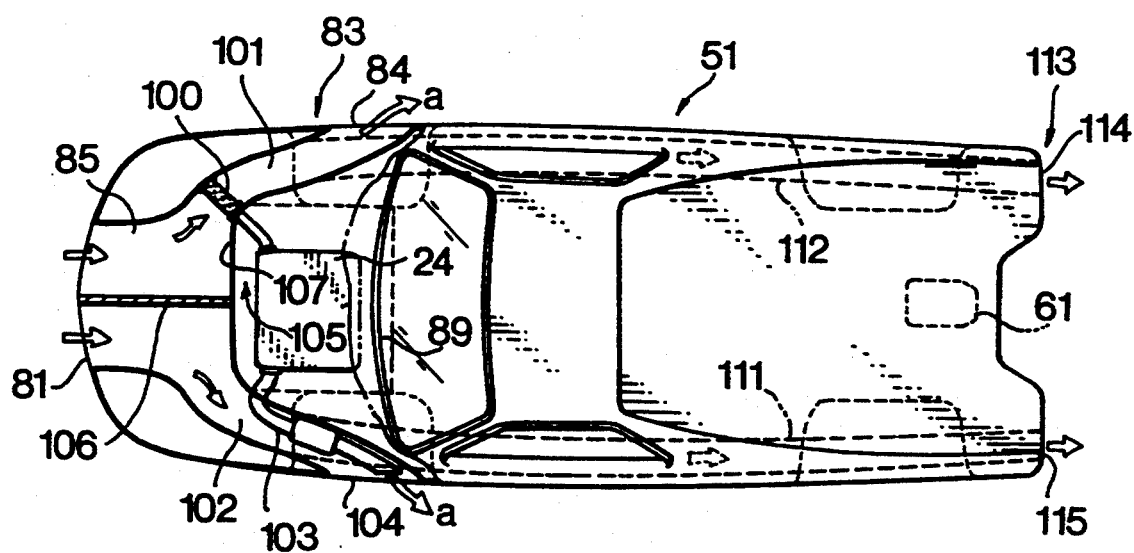
FIG. 18 is a top view of a fifth embodiment of the present invention.
Figure 20:
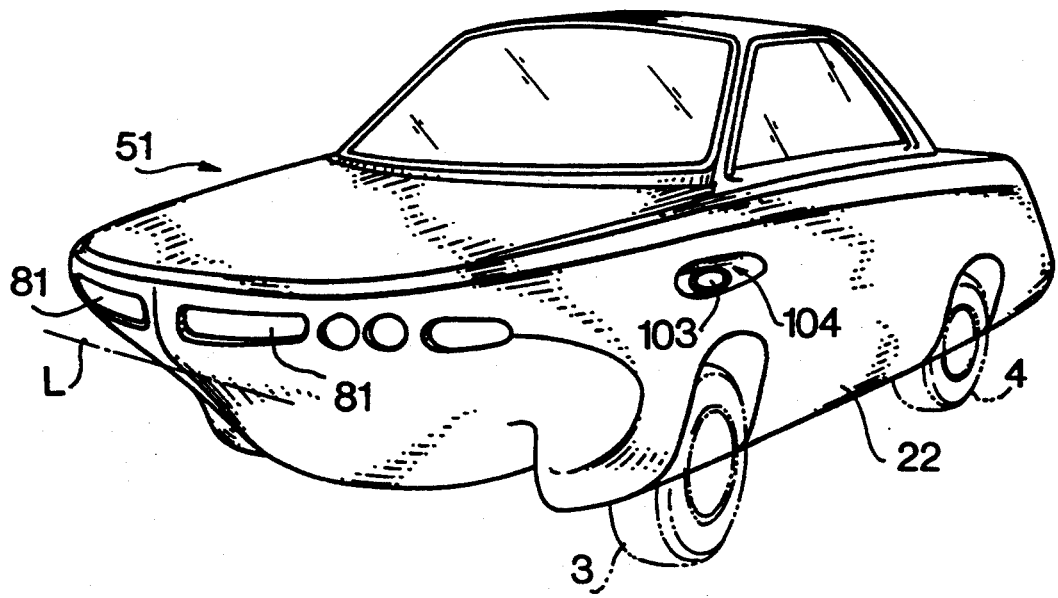
FIG. 20 illustrates a perspective view FIG. 18.
Figure 21:
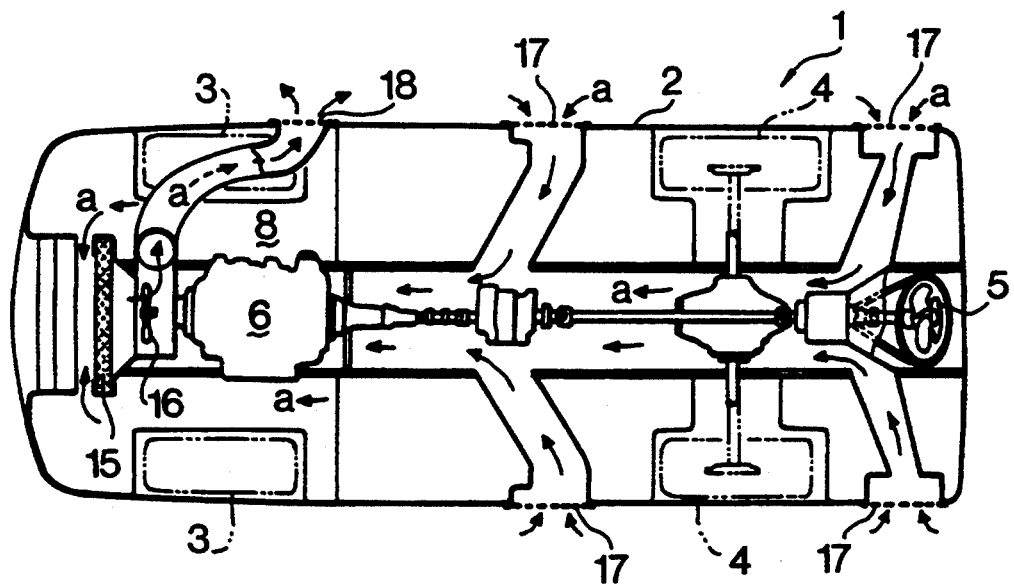
FIG. 21 is a top view showing a conventional amphibian motor vehicle.
Figure 22:
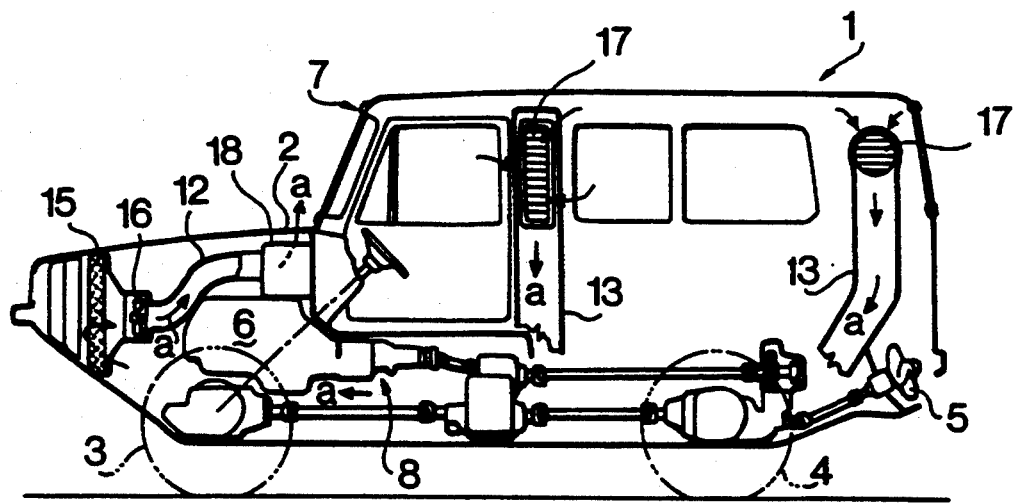
FIG. 22 is a perspective view of FIG. 21.
Figure 23:
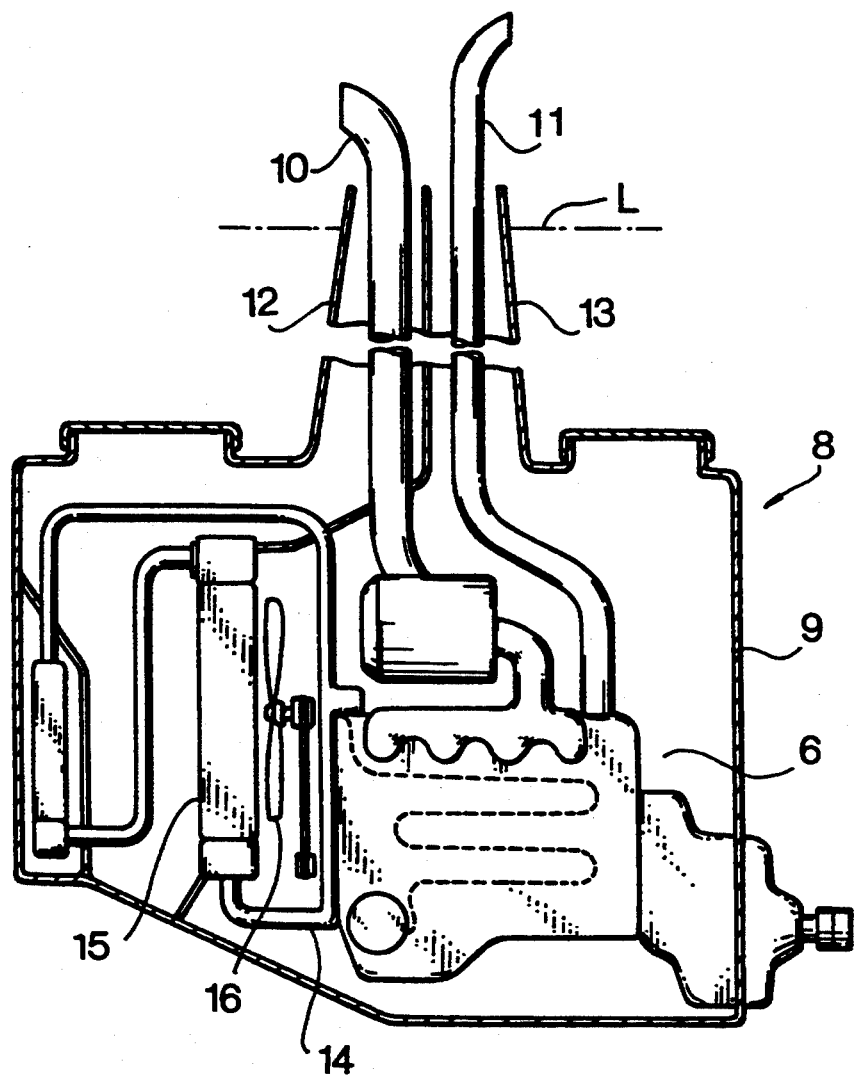
FIG. 23 is a lateral section showing engine and engine room of a conventional amphibian motor vehicle.

A fifth embodiment of the present invention will be described with reference to FIGS. 18 and 20.

The amphibian motor car has an air inlet 81, an air passage 85 and air outlets 84, like the previous embodiment. The air inlet 81 opens at the front of the vehicle body and the air outlets 84 open at the sides of the vehicle body. The air passage 85 is relatively short. The air passage 85 has two branches, forming a Y shape. The branches are defined by ducts 107. A radiator 100 is placed in one branch line 101 of the air passage 85 and an exhaust pipe 103 is placed in the other branch line 102. The vehicle body may be made from synthetic resin.

The exhaust pipe 103 extends into the branch line 102 from the engine 24 since exhaust ports of the engine 24 are close to the branch line 102 rather than the other branch line 103. The exhaust pipe 103 terminates just in front of the exit 104 of the branch line 102.

A partition plate 106 is placed in a front half of the air passage 85 to divide the air passage 85 into two ways. Therefore, the air coming into the air passage 85 is divided into two streams by the partition plate 106 before it reaches the branching point 105. The partition plate 106 spans between the air inlet 81 and the branch ducts 107. In this embodiment, the partition plate 106 is offset to the branch line 102 so that a larger amount of air can go to the radiator 100.

With this structure, the radiator 100 and exhaust pipe 103 are appropriately cooled respectively. Specifically, the radiator 100 is cooled with the air coming naturally or forcedly into the air passage 101. Therefore, it is not necessary to provide a motor driven or an electrically driven cooling fan. Further, since the exhaust pipe 103 is drawn out of the engine room 89, the temperature in the engine room 89 does not rise excessively. The engine room 89 is cooled with the air coming from the openings 81. Thus, elements placed in the engine room 89 and vehicle body 51 are not damaged with the heat of the exhaust gas. This is advantageous particularly if the vehicle body 51 is made from resin.

Since the partition plate 106 is placed in the air passage 85, it is possible to control air flow rates to the branch lines 101 and 102 depending on various factors such as air resistance of the branch lines 101 and 102 and temperatures of the radiator 100 and exhaust pipe 103. Therefore, a desired cooling can be realized or a radiator cooling efficiency can be improved. In other words, it is possible to prevent a larger amount of external air from entering the branch line 102 which has a smaller air resistance. For example, by offsetting the partition plate 106 to the exhaust pipe side branch line 102, like the illustrated embodiment, a sufficient amount of air goes to the radiator side branch line 101. Otherwise, most of the air flows into the other branch line 102 since the radiator side branch line 101 has a larger air or channel resistance.

Other structures and advantages of this embodiment are the same as the fourth embodiment.

Figure 19:
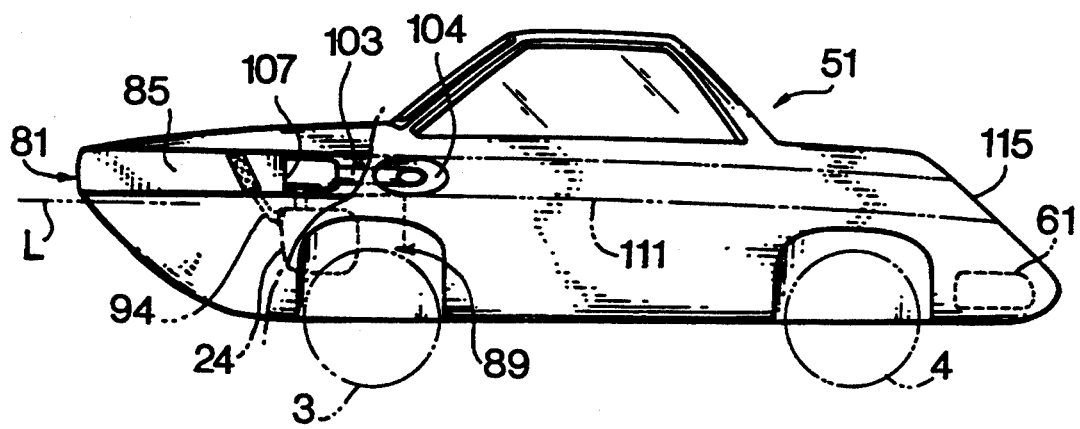
FIG. 19 illustrates a lateral view of FIG. 18.

In this embodiment, the branch lines 101 and 102 are relatively short and terminate at the lateral faces 83 of the vehicle body 51 respectively. However, the branch lines 101 (111) and 102 (112) may be elongated to have shapes like those illustrated in the second and third embodiments (FIGS. 5 and 9), as indicated by double-dot imaginary lines in FIGS. 18 and 19. In such a case, the air outlets 114 and 115 are formed at the rear 113 of the vehicle body 51. The radiator 100 and the exhaust pipe 103 are appropriately placed In the branch lines 111 and 112 respectively.

We claim:

1. An Amphibian motor vehicle of the type having a radiator for air cooling a coolant flowing in the radiator from an engine but not having a fan for cooling the radiator, comprising:
    a watertight engine room formed in a lower part of a vehicle body and housing the engine;
    an air intake opening formed at a front part of the vehicle body such that the air intake opening is positioned above water level when the amphibian motor vehicle cruises on water;
    an air passage disposed above the engine room and extending to an air exit formed at an upper front part of the vehicle body, the air passage being separated from the engine room by a plate member and extending from the air intake opening generally horizontally or slightly downward in the longitudinal direction of the vehicle body such that an ambient air naturally flows into the air intake opening as the amphibian motor vehicle moves forward and a sufficient amount of air is guided by the air passage and directly introduced to the radiator to cool the radiator, the radiator being disposed in the air passage; and
    means for supporting the radiator means in a position inclined forward relatively close to horizontal.

2. The amphibian motor vehicle of claim 1, wherein a negative pressure generator which produces negative pressure using wind coming into the air passage as the vehicle moves is provided near the air passage exit.

3. The amphibian motor vehicle of claim 2, wherein the radiator supporting means includes a mounting base for supporting a bottom of the radiator means and a removable holding member for pressing the top of the radiator means downward.

4. The amphibian motor vehicle of claim 3, wherein the upper front part of the vehicle body is defined by a bonnet and the holding member includes a holding plate mounted on an inner face of the bonnet.

5. An amphibian motor vehicle of the type having a radiator for air cooling a coolant flowing in the radiator from an engine but not having a fan for cooling the radiator, comprising:
    a watertight engine room formed in a lower part of a vehicle body and housing the engine;
    an air intake opening formed at a front part of the vehicle body such that the air intake opening is positioned above water level when the amphibian motor vehicle cruises on water;
    an air exit formed at a lateral part of the vehicle body, the air exit opening to the atmosphere at a position above and behind front wheels of the vehicle; and
    an air passage separated from the engine room by a plate member and extending generally horizontally or slightly downward in the longitudinal direction of the vehicle body from the air intake opening to the air exit, the radiator being located in the air passage such that an ambient air flows into the intake opening as the amphibian motor vehicle moves forward and a sufficient amount of air is guided by the air passage and directly introduced to the radiator to cool the radiator.

6. The amphibian motor vehicle of claim 5, wherein the air exit is defined by an opening formed in a front pillar of a front window in front of a driver's seat of the vehicle.

7. The amphibian motor vehicle of claim 6, wherein the air passage extends substantially horizontal or slightly downward in the longitudinal direction of the vehicle body.

8. The amphibian motor vehicle of claim 7, wherein an exhaust line of the engine extends into the air passage downstream of the radiator means.

9. The amphibian motor vehicle of claim 8, wherein the air exit includes a plurality of openings formed at both sides of the vehicle body and the air passage is divided, at a predetermined position in a front half of the vehicle body, into a plurality of branch lines.

10. The amphibian motor vehicle of claim 9, wherein the radiator means is located ahead of the predetermined branching position.

11. The amphibian motor vehicle of claim 9, wherein one radiator means is disposed in each branch line of the air passage.

12. The amphibian motor vehicle of claim 10, wherein a partition plate disposed in front of the branching position in the air passage such that the air passage is divided into two routes ahead of the branching position.

13. The amphibian motor vehicle of claim 12, wherein the partition plate is positioned in the air passage in an off set manner with respect to a center line of the air passage to divide the air passage into two routes such that a volume of air flowing into one route is larger than that of air flowing into the other route, and the one route extends to one branch line and the other route extends to another branch line.

14. The amphibian motor vehicle of claim 13, wherein the radiator is disposed in one branch line whereas an exhaust line of the engine is disposed in the other branch line.

15. The amphibian motor vehicle of claim 14, wherein the exhaust line terminates upstream of the air exit of the air passage.

* * * * *